United States Patent [19]

Maier et al.

[11] Patent Number: 4,779,903

[45] Date of Patent: Oct. 25, 1988

[54] SEALING RING

[75] Inventors: Hans P. Maier; Nikolay Vlaykovski, both of Villingen-Schwenningen, Fed. Rep. of Germany

[73] Assignee: Agintec AG, Pfaeffikon, Switzerland

[21] Appl. No.: 795,173

[22] Filed: Nov. 5, 1985

[30] Foreign Application Priority Data

Dec. 11, 1984 [DE] Fed. Rep. of Germany ....... 8436214
Dec. 11, 1984 [DE] Fed. Rep. of Germany ....... 8436215

[51] Int. Cl.$^4$ .................. F16J 15/12; F16L 19/02
[52] U.S. Cl. .................. 285/336; 277/101; 277/167.5; 277/198; 277/206 R; 277/207 A; 285/177; 285/340; 285/341; 285/368; 285/906
[58] Field of Search ............ 277/207 A, 206 R, 192, 277/165, 198, 199, 101, 167.5; 285/110, 111, 112, 113, 368, 379, 232, 331, 334.1, 334.2, 337, 349, 350, 369, 53, 45, 46, 363, 364, 340, 341, 906, 336

[56] References Cited

U.S. PATENT DOCUMENTS

| | | | |
|---|---|---|---|
| 717,008 | 12/1902 | Lochridge et al. | 277/192 X |
| 2,111,419 | 3/1938 | Crotty | 285/368 X |
| 2,269,695 | 1/1942 | Scharf | 285/53 |
| 2,307,874 | 1/1943 | Bilde | 277/165 X |
| 2,376,017 | 5/1945 | Smallpeice | 285/368 X |
| 2,777,715 | 1/1957 | Beyer | 285/349 X |
| 2,821,415 | 1/1958 | Race, Jr. | 285/112 |
| 2,871,036 | 1/1959 | Goodman | 285/379 X |
| 2,892,644 | 6/1959 | Collins | 277/206 X |
| 3,061,665 | 10/1962 | Rugg et al. | 285/369 X |
| 3,188,122 | 6/1965 | Smith | 285/369 X |
| 3,249,369 | 5/1966 | Jahrig | 285/369 X |
| 3,269,754 | 8/1966 | Bertling et al. | 285/110 X |
| 3,291,506 | 12/1966 | Blakeley | 285/112 |
| 3,385,543 | 5/1968 | Jakel et al. | 277/192 X |
| 3,516,689 | 6/1970 | Binford et al. | 285/369 X |
| 3,591,207 | 7/1971 | Fisher | 277/206 R |
| 3,851,888 | 12/1974 | Limpson, Jr. et al. | 277/206 R |
| 4,011,652 | 3/1977 | Black | 285/53 X |
| 4,371,179 | 2/1983 | Bohman | 285/110 X |
| 4,398,754 | 8/1983 | Caroleo et al. | 285/334.2 X |
| 4,480,861 | 11/1984 | Cann, Jr. | |
| 4,667,988 | 5/1987 | Maier et al. | 285/340 |

FOREIGN PATENT DOCUMENTS

| | | | |
|---|---|---|---|
| 272016 | 6/1969 | Austria . | |
| 2518898 | 11/1976 | Fed. Rep. of Germany . | |
| 3206570 | 9/1983 | Fed. Rep. of Germany | 285/340 |
| 1234231 | 10/1960 | France | 285/369 |
| 1391469 | 1/1965 | France | 285/110 |

Primary Examiner—Allan N. Shoap
Attorney, Agent, or Firm—Foley & Lardner, Schwartz, Jeffery, Schwaab, Mack, Blumenthal & Evans

[57] ABSTRACT

Disclosed is a sealing ring comprising a molded elastomer ring having an inner ring contained therein which forms a pipe joint between two abutted pipe ends. Each of the pipe ends includes a recessed part, a flange or the like, which can be clamped together, for example, by means of a screw, and each of which has a sealing cavity into which the two axial ends of the sealing ring sealing the joint project. The axial ends of the sealing ring are deformed by the clamping together of the two recessed parts or the like and conform to the contour of the interior of the corresponding sealing cavity. To facilitate assembly and improve sealing properties, the two outer annular edges of the molded elastomer ring which rest against the surface of the two pipe ends are rounded and thus provided with a radius (R1).

12 Claims, 6 Drawing Sheets

SEALING RING

BACKGROUND OF THE INVENTION

The present invention relates to a sealing ring for forming a pipe joint between two abutting pipe ends. More specifically, the sealing ring comprises a molded elastomer ring having an inner ring embedded therein. The axial ends of the sealing ring, which surrounds the butt joint of the pipe ends, extend into a sealing cavity formed in a recessed part, a flange or the like provided on the pipe ends and clamped together by screws. The axial ends are deformed when the two recessed parts or the like are clamped together and conform to the contour of the interior of the adjacent sealing cavity.

A device of this type is described in German Auslegeschrift No. 3,206,570. According to this document, a flange, at least one clamping element, and a recessed part, which can be clamped together by means of screws, are loosely slid onto each of two pipe ends. The flange and recessed part form between them a clamp recess into which the clamping element extends. The clamping element is support against the pipe end by a radially outwardly projecting clamping edge. The clamping element is overlapped by a clamping surface of the clamp recess with respect to a radially outward clamping edge. The clamping element projects axially outwardly from the clamp recess in such a way that an axial pressure exerted on the clamping element leads to an increase in the outside diameter and a decrease in the inside diameter of the clamping element. Each of the two recessed parts has a sealing cavity to accept the sealing ring, which cavities open toward the butt joing. The clamp recess which holds the clamping element is located in the aforesaid flanges and opens facing the butt joint. Both recessed parts can be clamped together by screws.

This pipe joint is particularly suited for high pressure use, and has already proven itself in practice. It has been shown, however, that under heavy loads, extrusion of the molded elastomer ring takes place in the region of its two outside annular edges which abut the outer surface areas of the two pipe ends. In these cases, sealing material flows into the tolerance gap between the recessed part and the pipe surface. It has further been shown that the assembly of this kind of pipe joint can lead to difficulties with regard to the mutual alignment of the pipe ends to be joined. Furthermore, the sealing ring is not suited for certain pipe surfaces.

SUMMARY OF THE INVENTION

It is therefore an object of the present invention to improve the sealing properties and assembly of the sealing ring.

A specific object of the invention is to provide a sealing ring which does not extrude into the gaps between the recessed parts and the pipe surface.

Furthermore, an additional object is to provide a sealing ring which can be used to join different size pipes.

A still further object of the invention is to provide a pipe joint in which the pipe ends are mutually aligned.

In accomplishing the foregoing objects, there has been provided in accordance with one aspect of the present invention, a sealing ring for forming a pipe joint between the ends of two pipes, the pipe ends also including recessed parts which house the sealing ring, comprising a molded elastomer ring which includes an annular groove which extends radially along the inner surface of the ring, and an inner ring positioned in the annular groove of the elastomer ring, wherein the outer edges of the inner surface of the elastomer ring are rounded. In a preferred embodiment, the radius of the rounded edges of the elastomer ring is greater than the sum of the positive and negative tolerance of the diameters of the pipes and the mounting gap between the inside diameter of the recessed parts and the greatest pipe diameter tolerance.

Advantageously, the sealing ring comprises a centrally disposed annular groove which extends radially along the outer surface of the ring, and the inner ring comprises an annular shoulder extending along the inner surface of the inner ring and projecting between the two pipe ends.

In accordance with a further aspect of the present invention, there has been provided a pipe joint, comprising two pipe ends in abutting relation, each of which includes (1) a recessed part, a flange, a screw securing the flange and the recessed part, and a sealing cavity; and (2) a sealing ring which includes an elastomer ring which comprises an annular groove extending along the inner surface thereof, and an inner ring positioned in the annular groove of the elastomer ring, wherein the outer edges of the inner surface of the elastomer ring are rounded and the axial ends of the sealing ring extend into and conform to the sealing cavity.

The present invention attains the above objects by rounding the two outside annular edges of the molded elastomer ring which abut the surfaces of the two pipe ends. Advantageously, the radius by which the edges are rounded is greater than the sum of the positive and negative tolerances of the pipe diameters plus the mounting gap between the inside diameter of the recessed parts and the greatest pipe diameter tolerance. By such a design, extrusion of the sealing ring material is prevented.

In a low-pressure pipe joint, it is sufficient to draw only the two flanges of the pipe ends together by means of tension screws, thereby also pressing the two recessed parts against the seal located between them. In an embodiment modified in this manner, the clamp recess can be provided in the recessed part, thereby allowing the two flanges to form flat covers. The clamp recess thus opens toward the butt joint. A problem arises in this design in that, in the case of pulsations at the circumferential abutment point, the radially outer portion of the sealing ring may be slightly squeezed out between the recessed parts, since the two recessed parts are not screwed together separately. Therefore, when pressure pulses are present, the portion of the sealing ring which has been squeezed between the recessed parts participates, at least partially, in the motion of the pipe ends, even if the motion is only minimal.

To eliminate this disadvantage, in an advantageous embodiment of the present invention the outside annular surface of the molded elastomer ring is provided with a centrally disposed annular groove which opens outwardly.

Assembly of the sealing ring, and hence joining of the pipes, can be facilitated if the inner ring has an inner, annular shoulder which projects between the two pipe ends to function as a stop. The annular shoulder of the inner ring thus serves as a stop for the two pipe ends, thereby guaranteeing the precise location of the pipe joing. The annular shoulder on the inner ring serves, moreover, as a means of assisting the transition between the two pipe ends to be joined, thus minimizing losses in flow.

It is practical, especially with large-diameter pipes, that the inner ring comprises several circular segments. Such a design facilitates assembly when the inner ring has a slightly wedge-shaped cross section which thickens radially toward the outside, and when the ring fits loosely into an annular groove in the elastomer ring which is adapted to the cross-section of the inner ring. The inner ring subdivided into circular segments can be manufactured more economically. To prevent the individual segments from falling from the elastomer ring during installation, the cross-section of the annular groove provided is slightly undercut, so that the circular segments press into the groove and can be held in place solely due to the elasticity of the elastomer.

An inner ring comprising individual circular segments is also advantageous when pipes with specially-formed ends are to be joined, for example, with pipes whose ends have an annular bulge or whose circumference is slightly arched or flanged. This is also true for pipes coated on the inside whose inner coating is drawn outwardly around the pipe end as far as a strip-shaped region of the outer covering. In this situation, the installation of inner rings which have a clear inside diameter approximately equal to the outside diameter of the pipes to be joined would be difficult, if possible at all.

If there is a danger of damage to the pipe ends, an inner ring which preferably comprises polytetrafluoroethylene can be used. In using polytetrafluorethylene, the annular shoulder of the inner ring provides a cushion between the two pipe ends. If enamelled pipes are used, the face regions of the cushion can also be provided with a layer of enamel, for example. This protection is important, since, depending on the bulging of the clamping elements used in the pipe joint when the pipe joint is drawn together, axial forces can arise which compress the two pipe ends against each other.

In a practical embodiment, the inner ring can attach to the elastomer ring from below by means of annular lips, one located on each side of the annular shoulder. The thickness of these annular lips is approximately 0.5 mm. These thin lips thus cover the inner surface of the elastomer ring, so that the elastomer ring is covered with respect to the medium flowing through the pipes.

The inner ring in all embodiments loosely fits in the annular groove of the elastomer ring so that the working pressure of the medium intensifies the sealing effect of the elastomer ring.

Often, pipe conduits conforming to different standards must be joined to pipe conduits conforming to older and basically obsolete standards. Pipe conduits conforming to different standards often have divergent outside pipe diameters. According to the present invention, such pipe ends of differing diameters can be joined together easily and safely with a pipe joint of the present design if the annular region of the sealing ring abutting one pipe end has a different clear inside diameter than the region of the sealing ring abutting the other pipe end. To obtain a joint with as little swirl as possible in this situation, it is advantageous to provide the inner ring with a conical inner contour which compensates for the differing inside diameters of the pipe ends to be joined.

A sealing ring embodied in this manner, i.e., one in which the inner contour of both the molded elastomer ring and of the inner ring is stepped, allows pipe ends, e.g., conforming to ISO series I, to be joined with pipe ends conforming to DIN series II. The reduction adapters which previously had to be welded or screwed on can be eliminated.

Mounting a sealing ring as defined by the invention can be simplified in certain applications by providing the inner ring and its annular shoulder as separate pieces. It is then advantageous that the annular shoulder sit in an annular groove opening inwardly on the inner ring. It is simple to push the sealing ring, not yet provided with the annular shoulder, over a pipe, while the annular shoulder is first sprung into the aforesaid annular groove in the inner ring in the region of the abutment spot between the pipes to be joined.

When joining pipes of large nominal diameter, it may be practical to form the molded elastomer ring, and/or the inner ring, and/or the annular shoulder of the inner ring from an endless strip of material. A sealing ring of this type is then also suitable for flange joints when constructing containers and apparatus in which the recessed part and flange comprise a single component.

It is advantageous, especially for sealing at high pressures, that the cross section of the two inside edges of the molded elastomer ring which abut the surface of the two pipe ends form an angle of $\leq 90°$. Regardless of the cross sectional shape of the inside annular groove of the molded elastomer ring for accepting the inner ring, the embodiment of the aforesaid inner annular edges of the molded elastomer ring is of great significance with regard to sealing. As long as the previously mentioned angle $\beta$ is set at a maximum of 90°, but preferably somewhat smaller, self-sealing will occur in this region, especially at high pressures.

Other objects, features and advantages of the present invention will become apparent from the detailed description of preferred embodiments which follows, when considered with the attached figures of drawing.

DETAILED DESCRIPTION OF THE PREFERRED EMBODIMENTS

Figure 1:
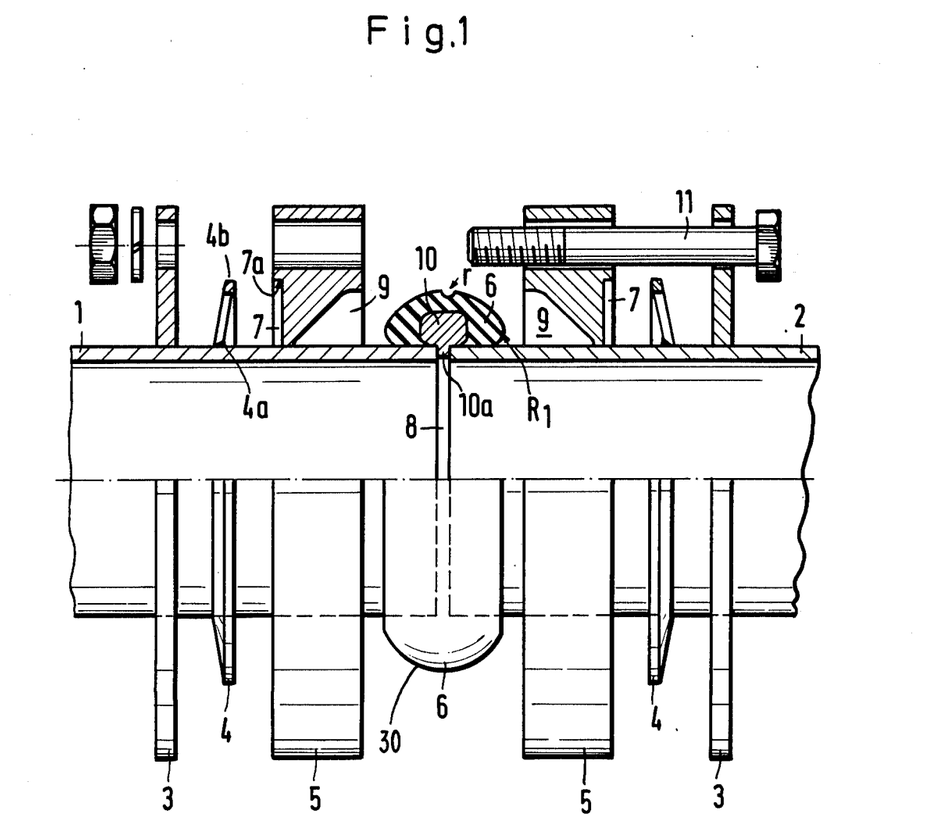
FIG. 1 presents a longitudinal sectional view of a pipe joint according to the present invention being assembled.

In order to provide a pipe joint according to FIG. 1, a flange 3, a clamping element 4, and a recessed part or collar 5 are slid onto each of two pipe ends 1, 2 which are to be butt joined to each other. Additionally, a sealing ring 30, shared by the two pipe ends 1, 2, is slid onto the pipe ends. Each recessed part 5 has a clamp recess 7, shaped as a circular ring and opened toward the flange 3. The recess is provided with a clamping element 4, which is slid into place. The clamping element 4 includes a convex shaped disk having a clamping rim 4a which extends radially along the inside diameter of the shaped disk and by which the shaped disk abuts pipe end 1 or 2. The disk also includes a clamping rim 4b which extends radially along the outside diameter of the shaped disk and is overlapped by a ring-shaped clamping surface 7a of clamp recess 7. When loose, the clamping element 4 projects past the end face of the corresponding recessed part 5. The embodiment of the clamping elements 4 is selected in such a way that a force pressing one of the clamping elements axially against the rear of its corresponding clamp recess 7 leads to an increase in the outside diameter and simultaneously to a decrease in the inside diameter of the clamping element. The recessed part 5, in each case, is provided with sealing cavity 9 which opens toward the butt joint 8. The sealing cavity 9 is preferably in the shape of a cone, hence converging in the direction of the neighboring flange 3. This conical embodiment is important for the load on the sealing ring.

The butt joint 8 is enclosed by the sealing ring 30. The sealing ring 30 comprises a molded elastomer ring 6 which has an annular groove 6a (FIG. 4B) extending along the inner circumference of the ring 6 and opening toward the center of the ring. The annular groove 6a houses an inner ring 10 which is loosely embedded therein. The external contour of the molded elastomer sealing ring approximately corresponds to that of the two sealing cavities 9 in the recessed parts 5 (FIG. 1). The sealing ring is somewhat oversized so that upon bringing the two recessed parts 5 together, the sealing ring is subjected to a pressure which is directed axially and radially inwardly of the sealing ring. Clamping of the pipe joint is effected by four threaded bolts 11 spaced evenly around the circumference of the flange and inserted through the flanges 3 and the recessed parts 5.

Figure 2:
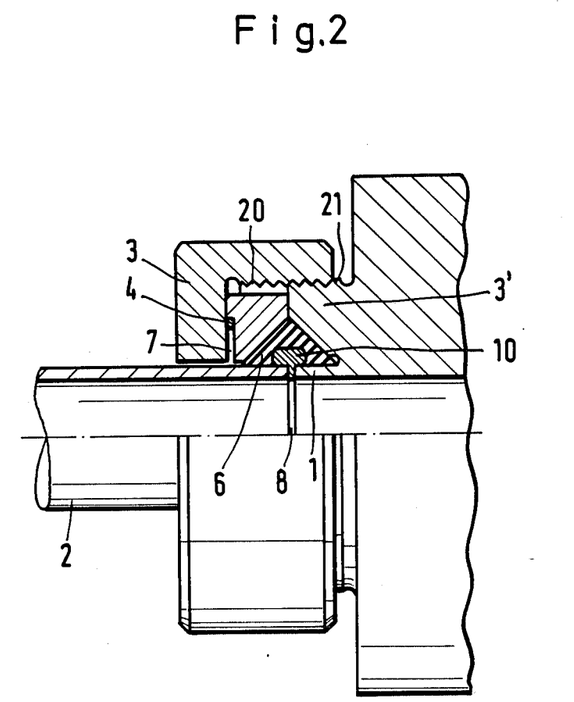
FIG. 2 presents a longitudinal sectional view of an assembled pipe joint according to a further embodiment.

FIG. 2 illustrates the application of the sealing ring 30 in a pipe connection having a fixed flange 3' on the machine side of the joint. The flange 3', which can also form a portion of the housing, is fixed and includes one of the two sealing cavities for the corresponding axial ends of the sealing ring 30. The sealing cavity in flange 3' on the machine side thus simultaneously produces the pipe union 1. The flange 3 on the pipe side is in the form of a socket with an inside thread 20 that screws onto an outside thread 21 of flange 3' on the machine side.

Figure 3:
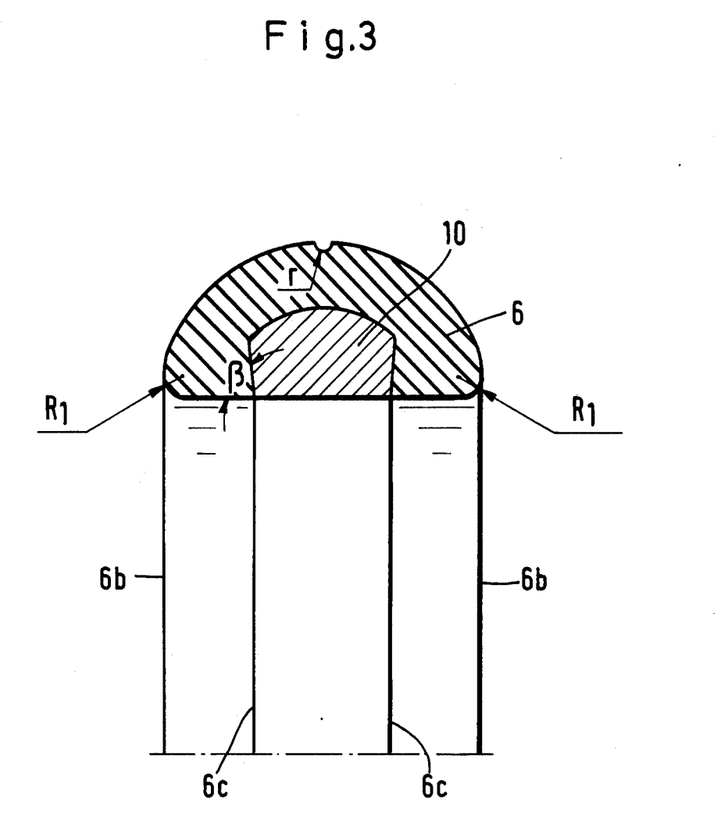
FIG. 3 presents an enlarged cross-sectional view through one half of a sealing ring.

FIG. 1, and especially FIG. 3, further illustrate the sealing ring 30. As illustrated, the molded elastomer ring 6 includes two external annular edges 6b which abut the outer surface area of the two pipe ends 1, 2. The annular edges 6b have a radius R1. The molded elastomer ring 6, moreover, includes a centrally disposed annular groove r which opens in the direction opposite the center of the ring and which extends along the outside surface area of the ring.

According to FIGS. 1, 2 and 4 through 7, the inner ring 10 has an inner annular shoulder 10a which projects between the two pipe ends 1, 2 and serves as a stop. According to FIG. 4A, the cross section of this inner ring 10 is slightly wedge-shaped, with increasing thickness toward the outside diameter of the ring. The slope of the wedge is indicated by angle β. The ring fits loosely in the annular groove 6a in the molded elastomer ring 6. The cross-section of the groove corresponds to the cross-section of the inner ring.

As can be seen, particularly in the cross-sectional representation of FIG. 3, the two inner annular edges 6c of the molded elastomer ring 6 which abut the outer surface areas of the two pipe ends 1, 2 form an angle of <90°. This characteristic enhances sealing properties, especially at high pressures.

Figure 4A:
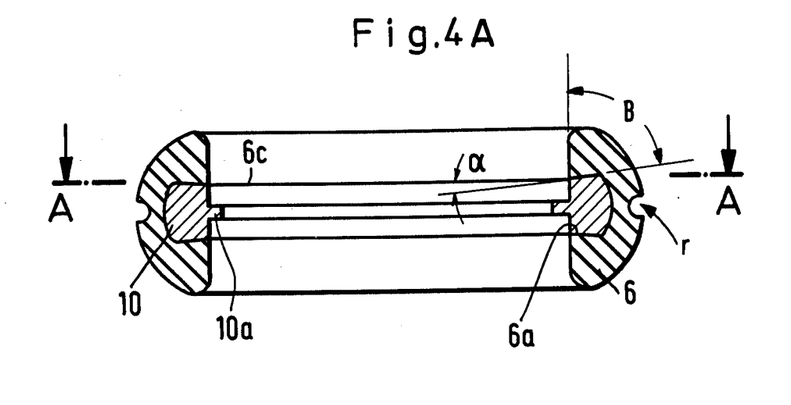
FIG. 4A is an enlarged cross-sectional view taken along line B—B of FIG. 4B of the sealing ring according to the present invention.
Figure 4B:
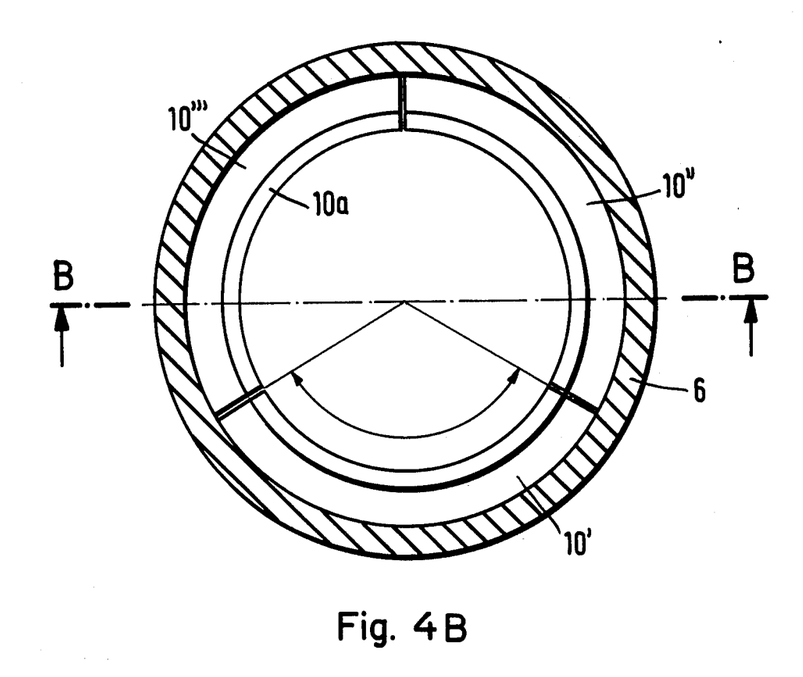
FIG. 4B is an enlarged cross-sectional view taken along line A—A of FIG. 4A of the sealing ring of the present invention.

FIG. 4B is a cross-sectional representation of the inner ring 10 taken along Section A—A of FIG. A. As illustrated by FIG. 4B, the inner ring 10 comprises three circular segments 10', 10", and 10''', each of which extends through 120 degrees of the ring's circumference.

Figure 5:
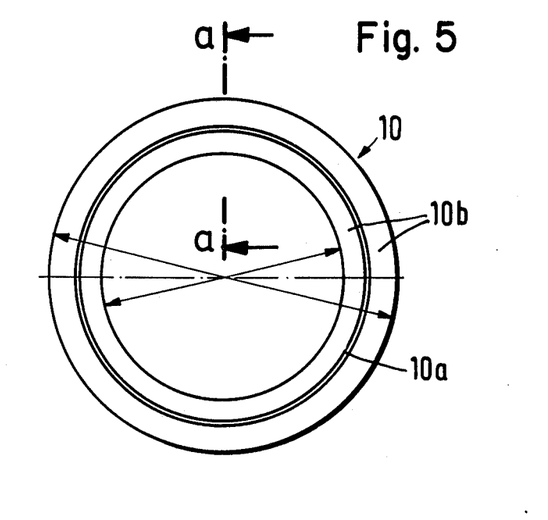
FIG. 5 is a side elevation view of one section of a modified embodiment of an inner ring for a sealing ring.
Figure 6A:
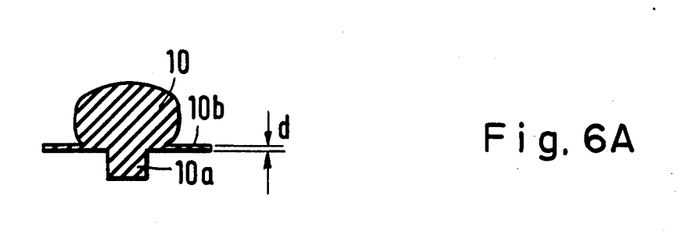
FIG. 6A is a cross-sectional view of the inner ring of FIG. 5 taken along line a—a.
Figure 6B:
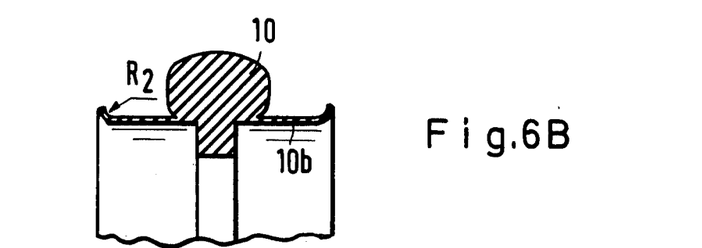
FIG. 6B is a cross-sectional view of the modified inner ring of FIG. 5.

As shown in FIGS. 5 and 6, the inner ring 10 attaches to the underside of the elastomer ring by means of annular lips 10b which are located on either side of the annular shoulder 10a. The thickness d of the annular lips 10b is preferably approximately 0.5 mm. In the embodiment shown in FIG. 6B, the two lips 10b are somewhat wider and progressively contoured to form rim R2 by which they attach, on both sides, to the molded elastomer ring 6. This design provides the end faces of the molded elastomer ring with an additional support having a radius corresponding to the radius R1 of the annular edges of the elastomer ring 6. Accordingly, molded rings of lesser Shore hardness, which are more amenable to installation and more economical, can be employed.

Figure 7:
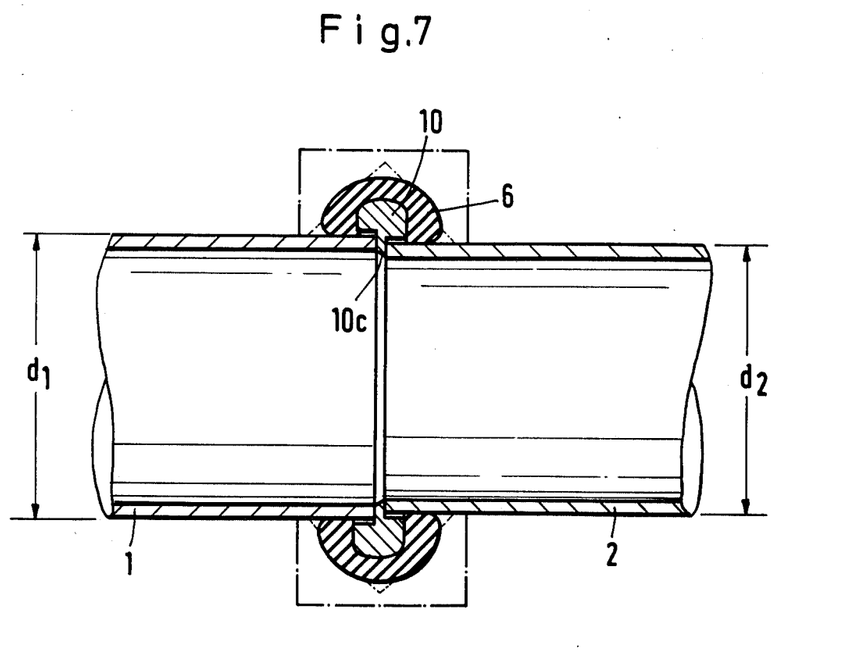
FIG. 7 is a schematic cross-sectional representation of a modified embodiment of the pipe joint of FIG. 1.

In the embodiment shown schematically in FIG. 7, the pipe ends 1, 2 to be joined together have differing outside diameters d1 and d2. In such a case, the annular region on the sealing ring 30 abutting pipe end 1 has a larger inside diameter than the similar region abutting the other pipe end 2. The inner ring 10 has a conical inside contour 10c which compensates for the different inside diameters of the pipe ends 1, 2 to be joined together. The conical design prevents the portion of the shoulder 10a from extending into the interior flow cross-section of the pipe.

What is claimed is:

1. A sealing ring for forming a pipe joint between contiguous ends of two axially aligned pipes having a generally smooth cylindrical outer surface, each of said pipe ends being surrounded, with formation of a mounting gap, by a collar part having an axial recess facing said contiguous ends for receiving the sealing ring, comprising:

(a) a molded elastomer ring comprising an annular inner groove extending along an inner circumference of said ring and opening toward the center of said ring, said inner groove having radially extending annular walls which form an angle (β) of less than 90 degrees with the cylindrical surface of said pipe ends, whereby the distance between said walls increases in the direction toward the outer surface of said elastomer ring, and a centrally disposed annular outer groove extending along the outer circumference of said ring, said outer groove opening in a direction away from the center of said ring;

(b) an inner ring embedded in said inner groove, said inner ring having a shape which corresponds to the shape of said annular inner groove with the radially outer portion of said inner ring having a width greater than the width of said inner annular groove at its entrance;

wherein: the external contour of said elastomer ring is approximately semicircular and the external axial edges of said elastomer ring, where the semicircle terminates at said pipe outer surface, have a radius R1 which is greater than the sum of the positive and negative tolerances of the pipe diameters plus the mounting gap between the inside diameter of said recessed collar parts and the greatest pipe diameter tolerance.

2. A sealing ring as claimed in claim 1, wherein said inner ring comprises an annular shoulder extending along the inner surface of said inner ring, said shoulder projecting between the two pipe ends.

3. A sealing ring as claimed in claim 2, wherein said annular shoulder comprises an endless strip of material.

4. A sealing ring as claimed in claim 1, wherein said inner ring comprises a plurality of accurate segments.

5. A sealing ring as claimed in claim 1, wherein said inner ring comprises a metal.

6. A sealing ring as claimed in claim 1, wherein said inner ring comprises polyethylene.

7. A sealing ring as claimed in claim 1, wherein said elastomer ring comprises an endless strip of material.

8. A sealing ring as claimed in claim 1, wherein said inner ring comprises an endless strip of material.

9. A pipe joint assembly, comprising:
  (a) two pipe ends in axially contiguous relation, said pipe ends having a generally smooth cylindrical outer surface;
  (b) a recessed collar part surrounding each of said pipe ends with formation of a mounting gap, both collar parts having an axial recess facing each other to define a sealing cavity;
  (c) a sealing ring surrounding the contiguous pipe ends and located in said sealing cavity, said sealing ring comprising
    (i) a molded elastomer ring comprising an annular inner groove extending along an inner circumference of said ring and opening toward the center of said ring, said inner groove having radially extending annular walls which form an angle ($\beta$) of less than 90 degrees with the cylindrical surface of said pipe ends, whereby the distance between said walls increases in the direction toward the outer surface of said elastomer ring, and a centrally disposed annular outer groove extending along the outer circumference of said ring, said outer groove opening in a direction away from the center of said ring; and
    (ii) an inner ring embedded in said inner groove, said inner ring having a shape which corresponds to the shape of said annular inner groove with the radially outer portion of said inner ring having a width greater than the width of said inner annular groove at its entrance;
  wherein the external contour of said elastomer ring is approximately semicircular and the external axial edges of said elastomer ring, where the semicircle terminates at said pipe outer surface, have a radius R1 which is greater than the sum of the positive and negative tolerances of the pipe diameters plus the mounting gap between the inside diameter of said recessed collar parts and the greatest pipe diameter tolerance; and
  (d) means for urging said collar parts toward one another to clamp said sealing ring in sealing engagement within said sealing cavity, whereby the axial edges of said sealing ring extend into and conform to said sealing cavity.

10. A pipe joint assembly as claimed in claim 9, wherein said inner ring further comprises an annular shoulder extending radially inwardly from its inner circumferential surface and projecting into a space formed axially between the two pipe ends.

11. A pipe joint assembly, comprising:
  (a) two pipe ends in axially contiguous relation, said pipe ends having a generally smooth cylindrical outer surface;
  (b) a recessed collar part surrounding each of said pipe ends with formation of a mounting gap, both collar parts having an axial recess facing each other to define a sealing cavity;
  (c) a sealing ring surrounding the contiguous pipe ends and located in said sealing cavity, said sealing ring comprising:
    (i) a molded elastomer ring comprising an annular inner groove extending along an inner circumference of said ring and opening toward the center of said ring, said inner groove having radially extending annular walls which form an angle ($\beta$) of less than 90 degrees with the cylindrical surface of said pipe ends, whereby the distance between said walls increases in the direction toward the outer surface of said elastomer ring, and means, including a centrally disposed annular outer groove extending along the outer circumference of said ring and opening in a direction away from the center of said ring, for preventing said molded elastomer ring from being squeezed out of said sealing cavity at a point where said collar parts come together;
    (ii) an inner ring embedded in said inner groove, said inner ring having a shape which corresponds to the shape of said annular inner groove with the radially outer portion of said inner ring having a width greater than the width of said inner annular groove at its entrance;
  wherein: the external contour of said elastomer ring is approximately semicircular and includes means for preventing extrusion of said elastomer ring through said mounting gap in response to axial movement of said pipe ends with respect to one another, said means for preventing extrusion through said mounting gap comprising a radius of curvature R1 on the external axial edges of said elastomer ring, where the semicircle terminates at said pipe outer surface, said radius R1 being large enough to prevent extrusion of said elastomer ring through said mounting gap between the inside diameter of said recessed collar parts and the greatest pipe diameter tolerance upon axial displacement of said pipe ends with respect to one another; and
  (d) means for urging said collar parts toward one another to clamp said sealing ring in sealing engagement within said sealing cavity, whereby the axial edges of said sealing ring extend into and conform to said sealing cavity.

12. A pipe joint assembly as claimed in claim 11, wherein said inner ring further comprises an annular shoulder extending radially inwardly from its inner circumferential surface and projecting into a space formed axially between the two pipe ends.

* * * * *